H. PIEPER.
VALVE MECHANISM FOR FOUR STROKE EXPLOSION ENGINES.
APPLICATION FILED OCT. 12, 1907.

906,819.

Patented Dec. 15, 1908.

2 SHEETS—SHEET 1.

UNITED STATES PATENT OFFICE.

HENRI PIEPER, OF LIEGE, BELGIUM.

VALVE MECHANISM FOR FOUR-STROKE EXPLOSION-ENGINES.

No. 906,819.  Specification of Letters Patent.  Patented Dec. 15, 1908.

Application filed October 12, 1907. Serial No. 397,235.

*To all whom it may concern:*

Be it known that I, HENRI PIEPER, subject of the King of Belgium, and residing at Liege, Belgium, have invented certain new and useful Improvements in Valve Mechanism for Four-Stroke Explosion-Engines; and I do hereby declare the following to be a full, clear, and exact description of the same, such as will enable others skilled in the art to which it appertains to make and use the same.

The present invention relates to improvements in multiple cylinder four-cycle explosive engines, and particularly to the valve mechanism of such engines.

The object of the invention is to provide a valve mechanism in which only two valves are required for each pair of cylinders, one valve regulating the inlet port of one and the exhaust port of the other cylinder and the other valve controlling the exhaust port of the first cylinder and the inlet port of the second.

A further object of the invention is to so construct a valve adapted for the purpose stated above that the charge of gas drawn into the cylinders will pass through the valves while the exhaust from the cylinders will pass about the valves.

Figure 1:
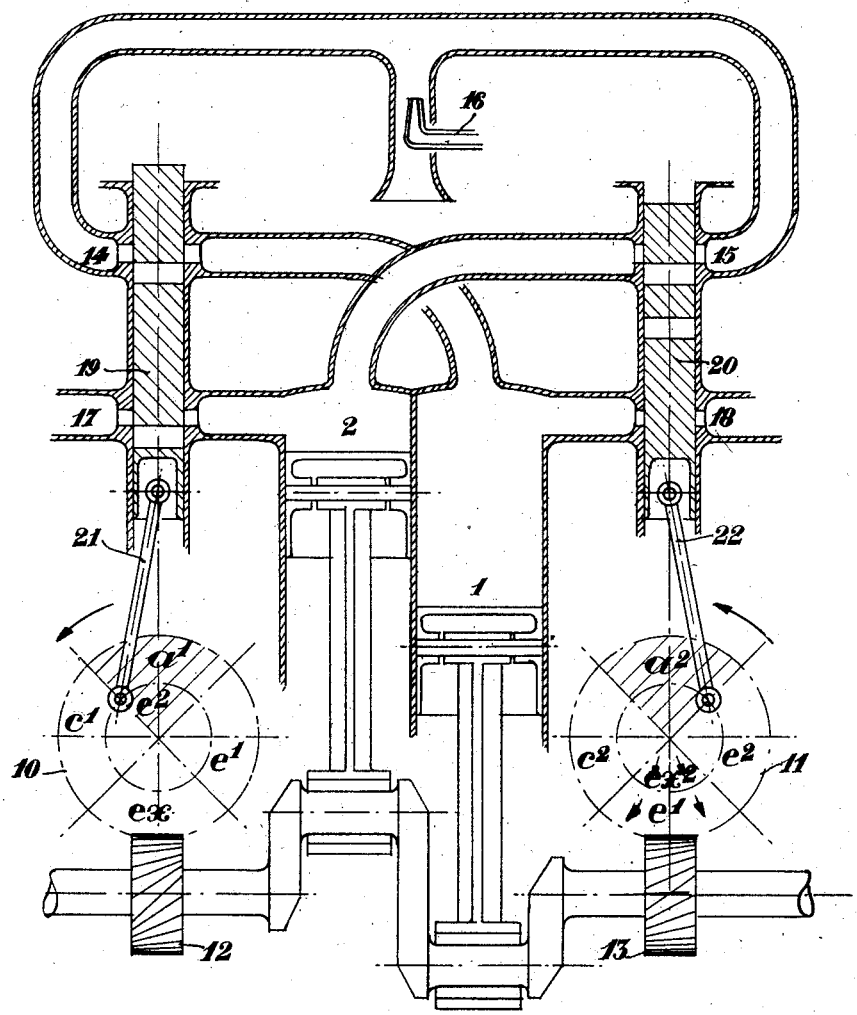
Figure 2:
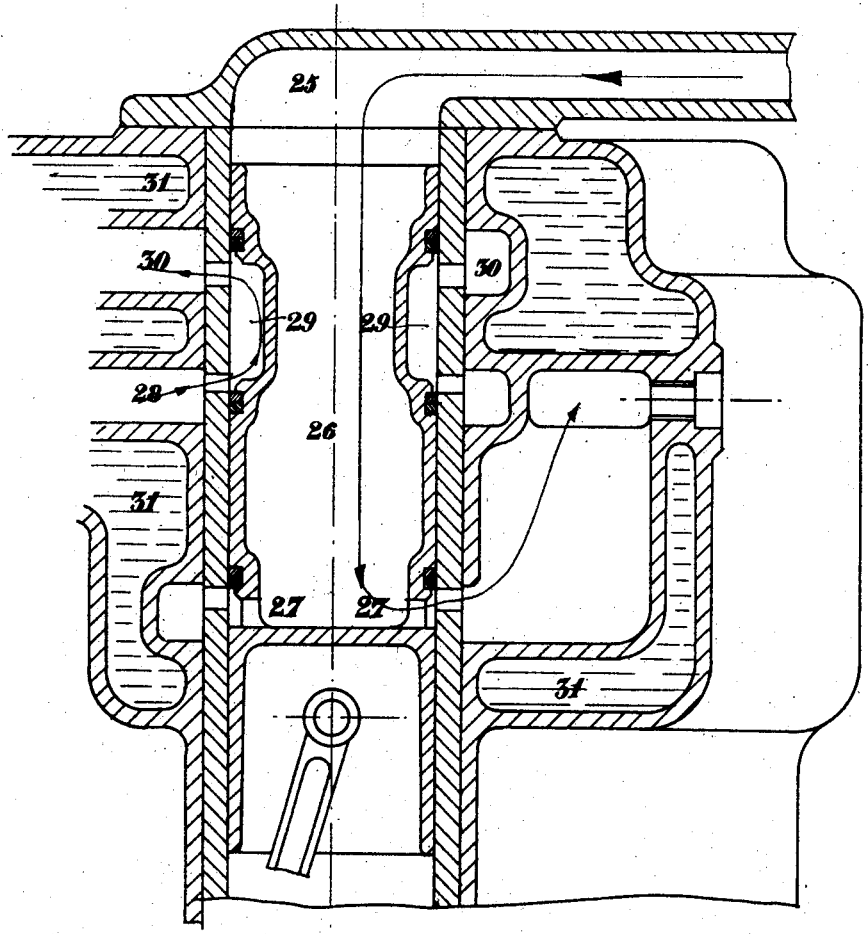

The drawings illustrate an embodiment of the invention, Figure 1 being a vertical sectional view through a cylinder engine having the cranks of its driving shaft separated by 180°, the controlling valves being illustrated more or less conventionally; Fig. 2 is a sectional view, on an enlarged scale, illustrating the preferred construction of valve.

Referring to Fig. 1 of the drawings it will be seen that the valve 19 controls the duct 14 leading from the inlet port of the cylinder 1 and also the duct 17 of the exhaust port of cylinder 2, and the ducts 15 and 18, communicating respectively with the inlet port of cylinder 2 and exhaust port of cylinder 1, are controlled by the valve 20.

The valves 19, 20 are reciprocating valves and are adapted to be driven at half the speed of the engine, being geared to the engine crank shaft by gears 12, 10 and 13, 11, links 21 and 22 connecting the valves with the gears 10 and 11.

Gas is supplied to the ducts 14, 15 from a suitable nozzle communicating with the carbureter, and as the engine operates the pistons and valves will assume various relations as indicated in Fig. 1. That is the sectors $a'$, $a^2$ represent the suction strokes, the sectors $c'$, $c^2$ the compression strokes, the sectors $ex$, $ex^2$ the explosion strokes, and the exhaust strokes are represented by the sectors $e'$, $e^2$.

When the parts are in the position shown in Fig. 1, the pistons in the cylinders 1, 2 have respectively just completed their suction and exhaust strokes, and the valve 19 has been shifted to close the inlet and exhaust ducts 14, 17. As the shaft turns the valve 20 is adjusted to bring the cylinder 2 into communication with the inlet duct 15, and while the piston in the cylinder 2 is making its suction stroke the other piston is compressing the charge in the cylinder 1. At the completion of a half revolution of the shaft the compression stroke of the piston in the cylinder 1 and the suction stroke of the piston in the cylinder 2 will be completed and the valve 20 adjusted to close the duct 15. At this time all of the inlet and exhaust ducts will be closed and the charge in the cylinder 1 will be exploded by suitable means not shown. During the next half revolution of the shaft the charge in the cylinder 2 will be compressed and as this is exploded the parts will be so positioned that the valve 20 will open the exhaust duct 18, whereby as the piston in the cylinder 2 descends under the force of its explosion and the piston in cylinder 1 rises it will expel the exhaust products from said cylinder. As the piston in cylinder 1 reaches the upper end of its cylinder the valve 20 will be adjusted to close the exhaust duct 18 without opening the inlet duct 15 and the valve 19 will be adjusted to open the inlet duct 14 and exhaust duct 17 so that during the next half revolution of the shaft the descending piston in cylinder 1 will draw into said cylinder a fresh charge, while the rising piston in cylinder 2 will expel the contents of said cylinder through the duct 17. That is, the valves are so constructed and arranged that a single valve is adapted to control the inlet duct or port to one cylinder and the exhaust duct or port from the other. It will be readily seen that the number of pairs of cylinders may be multiplied as desired, the same relative arrangement of valves controlling each pair.

While the drawing illustrates an embodiment of the invention in which the cranks on the engine shaft are separated by 180°, it will be readily seen that if both pistons were connected to the same crank only a single pair of valves would be required for controlling the inlet to one cylinder and the exhaust from the other.

Preferably the valves will be made in the form shown in Fig. 2. That is each will consist of a tubular body 26 receiving a combustible mixture from a supply duct 25 and having ports 27 adapted to communicate with the inlet port of the cylinder controlled by such valve, and an annular channel 29 surrounding the body 26 being adapted to communicate with ducts 28 and 30 leading respectively to the exhaust port of the cylinder controlled by said valve and the external atmosphere. The walls of the valve casing may contain water chambers 31.

It will be seen that the fresh gases will flow through the valve body 26 and prevent overheating of those portions of the wall of the valve about which the exhaust passes and which are not adapted to be directly effected by the water chambers 31.

Having thus described the invention, what is claimed is:

1. In a multiple cylinder four-cycle explosive engine, the combination of a pair of cylinders, pistons in said cylinders, a driving shaft having cranks separated by 180° and connected respectively to the pistons, of two valves each controlling the inlet port of one cylinder and the exhaust port of the other cylinder, and gearing connecting both valves with the driving shaft.

2. In a multiple cylinder four-cycle explosive engine, the combination with a pair of cylinders, of two valves adapted to control the inlet and exhaust ports of both cylinders, each valve controlling an inlet port of one cylinder and an exhaust port of the other cylinder.

3. In a multiple cylinder explosive engine, the combination with a pair of cylinders, of a valve adapted to control the inlet and the exhaust ports of the cylinders, respectively, said valve being tubular and having an annular groove or passage in its exterior wall, the inlet port controlled by the valve being arranged to communicate with the interior of the valve and the exterior passage of said valve communicating with a duct leading from the exhaust port of the other cylinder.

In testimony whereof I have signed my name to this specification in the presence of two subscribing witnesses.

HENRI PIEPER.

Witnesses:
EMILE HEPTIRS,
LOUIS BERCK.